Feb. 14, 1928.
O. C. CORDES
1,658,972
REGULATOR SYSTEM
Filed March 2, 1926
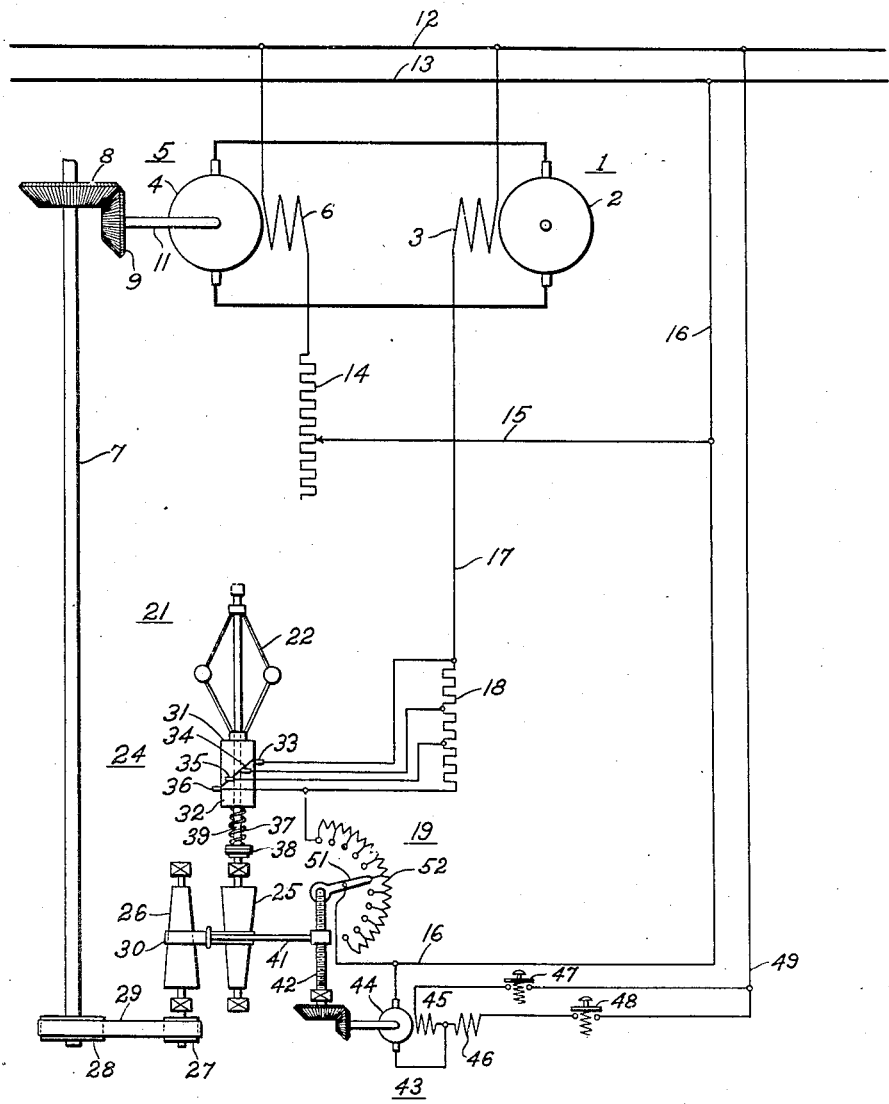
WITNESSES:
INVENTOR
Oscar C. Cordes.
BY
ATTORNEY Patented Feb. 14, 1928.

1,658,972

UNITED STATES PATENT OFFICE.

OSCAR C. CORDES, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed March 2, 1926. Serial No. 91,747.

My invention relates to regulator systems and more particularly to speed-regulating systems for electric motors.

An object of my invention is to provide means for maintaining the speed of an electric motor constant that is easily adjustable to maintain different predetermined speeds and is sensitive in its operation over a wide speed range.

My speed-regulating device comprises a rotary contactor having a cylinder, the surface of which comprises tapering conducting and non-conducting segments. The rotary contactor drum or cylinder is connected to a fly-ball governor so that the action of the fly-balls causes it to move longitudinally along a shaft to which it is splined. One end of the drum is fastened to a spiral spring, which is also fastened to the shaft. This spring acts as a reaction member and serves to take up any lost motion and to assist in damping out any hunting action.

Cooperating brushes are mounted so as to engage the surface of the rotary contactor drum, and may be mounted spirally with respect to the drum to give the most efficient operation. These brushes are connected to the several sections of a regulating resistor. The rotary contactor may be of any suitable type, such as that disclosed in the copending application of Stephen A. Staege, Serial No. 743,578, filed October 14, 1924, and assigned to the Westinghouse Electric and Manufacturing Company.

The rotary contactor drum and fly-ball governor are so connected as to be actuated in accordance with the speed of the motor to be regulated. A speed-changer is provided between the governor and the regulated motor to furnish mechanical means for changing the speed ratio of the governor with respect to the motor. The speed-changer may be operated by means of a small "split-series field" direct-current motor, which also actuates a field rheostat in series relation with the resistor that is controlled by the rotary contactor. The resistor and rheostat may be connected in the field circuit of the main driving motor or in circuit with the field winding of a generator supplying power to the motor. If used with a Ward Leonard control system, the regulator operates to control the field current of the generator. The regulator will function equally well in the field circuit of the controlled motor, the motor receiving its energy from a constant-voltage supply circuit. My regulating system is specially adapted for regulating the speed of a single-motor paper-machine drive.

My invention will be better understood by reference to the accompanying drawing, in which the single figure is a diagrammatic view of circuits and apparatus embodying my invention.

Referring to the drawing, a direct-current generator 1 is illustrated having an armature winding 2 and a field winding 3, the armature winding being directly connected to an armature winding 4 of a direct-current motor 5 having a field winding 6. The motor 5 is connected to drive a shaft 7 by any suitable means, such as gear-wheels 8 and 9 and shaft 11.

A pair of constant-voltage direct-current supply conductors 12 and 13 are provided for energizing the field windings 6 and 3 of the machines 5 and 1, respectively. The motor field winding 6 is connected to the supply conductor 12, through a variable resistor 14, and by means of conductors 15 and 16 to the supply conductor 13. The generator field winding 3 is connected to the supply conductor 12 and by means of a conductor 17 through a sectional resistor 18, a rheostat 19 and conductor 16 to the supply conductor 13.

The regulating device 21 comprises a fly-ball governor 22 and a rotary contactor 24 that is connected through a speed-changer device, such as cone pulleys 25 and 26 and belt 30, and through pulleys 27 and 28, which are connected by a belt or other suitable means 29, the pulley 28 being mounted on the shaft 7.

The rotary contactor 24 comprises tapered conducting and non-conducting surface portions 31 and 32, respectively, which are in engagement with a series of cooperating brushes 33, 34, 35 and 36 that are connected to the several sections of the resistor 18 and may be arranged spirally about the contactor drum. A coil spring 37 is connected between one end of the rotary contactor drum and a coupling member 38, which serves to join cone pulley 25 with shaft 39 along which the rotary contactor drum is adapted to slide. It will be noted that the position of the belt 30 upon the cone pulleys 25 and 26 determines the speed ratio between the shafts 7 and 39. This position is adjusted by means of a belt guide 41 that is actuated along a threaded shaft 42 in accordance with the operation of a pilot motor 43.

The pilot motor 43 comprises an armature winding 44 and a pair of differentially related or split-series field windings 45 and 46 that are adapted to be connected by means of push-button switches 47 and 48, respectively, and by means of conductor 49 to the supply conductor 12. By utilizing the one or the other of the field windings 45 and 46, the motor 43 may be operated at will in either direction. The pilot motor 43 operates the shaft 42, which actuates the speed-changer arm 41 and also contact arm 51 of the rheostat 19, for changing the effective value of the resistor 52 that is in circuit with the field winding 3 of the generator.

The operation of the regulator system is as follows. When the motor 5 is operating at normal speed, the fly-ball governor 22 will be rotated at a corresponding speed, through the agency of the illustrated mechanical connections. Any change in the speed of the motor will cause the governor to change its speed, thus varying the spread of the balls and the position of the rotary contactor drum 24, which slides along the shaft 39. The movement of the contactor drum along the shaft changes the relative positions of the brushes 33, 34, 35 and 36 and the conducting segment 31 of the drum 24, consequently short-circuiting the sections of the resistor 18 for different periods of time and thus correspondingly changing the effective value of the resistor. The position of the rotary contactor drum 24 upon the shaft 39 will be determined by the spread of the fly-ball governor 22, which will depend upon the speed at which the governor is operated.

When it is desired to change the speed of the line shaft 7, the pilot motor 43 is operated in the one or in the other direction by means of the push-button switches 47 and 48, respectively, thereby changing the position of the belt 30 upon the cone pulleys 25 and 26 to vary the speed ratio between the shafts 7 and the governor 22.

The rheostat 19 is operated simultaneously with the speed-changing device, thus varying the field excitation of the generator 1 that corresponds to a predetermined position of the rotary contactor drum upon the shaft 39. In this manner the speed of the governor 22, although the latter is driven by the variable-speed controlled motor 5, remains substantially the same, irrespective of the speed of the motor 5 and the line shaft 7. The governor is, therefore, operated at its most sensitive speed, and the rotary contactor drum is operated at approximately the middle position of its range of control irrespective of the speed of the controlled motor.

Many modifications may be made in the circuits and apparatus disclosed without departing from the spirit of my invention and I do not wish to be limited other than by the scope of the appended claims.

I claim as my invention:

1. In a regulator system, an electric motor, means for regulating the speed of said motor comprising a resistor and a speed-responsive device actuated in accordance with the speed of said motor for varying the effective value of said resistor, a second resistor connected in series relation with the first-named resistor, and means for varying the speed relation of said speed-responsive device and said motor and for simultaneously varying the effective value of said second resistor.

2. In a regulator system, an electric motor, means for regulating the speed of said motor comprising a resistor, a rotary contactor, and a speed-responsive device operated in accordance with the speed of said motor for actuating said rotary contactor to vary the effective value of said resistor, a second resistor connected in series relation with the first-named resistor, and means for varying the speed relation of said speed-responsive device and said motor and for simultaneously varying the effective value of said second resistor.

3. In a regulator system, the combination with an electric circuit comprising a resistor, speed-responsive means for controlling said resistor in accordance with the value of the regulated quantity, means for varying the value of the regulated quantity, and means comprising a second resistor for compensating the effect of such variation on the speed-responsive means.

4. In a regulator system, a dynamo-electric machine having a field winding, a resistor in circuit with said field winding, speed-responsive means for controlling said resistor in accordance with the value of the regulated quantity, manual means for varying the value of the regulated quantity, and means comprising a second resistor for compensating the effect of such variation on the speed-responsive means.

5. In a regulator system, the combination with an electric circuit comprising a resistor, speed-responsive means for automatically controlling said resistor in accordance with the value of the regulated quantity, manually operable means for varying the value of the regulated quantity, and means actuated jointly with said last named means comprising a second resistor for compensating the effect of such variation on the speed-responsive means.

In testimony whereof, I have hereunto subscribed my name this 20th day of February, 1926.

OSCAR C. CORDES.